United States Patent
Bertelsen et al.

(10) Patent No.: US 8,024,591 B2
(45) Date of Patent: Sep. 20, 2011

(54) METHOD OF AND APPARATUS FOR REDUCING POWER CONSUMPTION WITHIN AN INTEGRATED CIRCUIT

(75) Inventors: Lars Soendergaard Bertelsen, Aalborg (DK); Michael Allen, Austin, TX (US); Joern Soerensen, Aars (DK); James Dennis Dodrill, Dripping Springs, TX (US); Joseph Patrick Geisler, Austin, TX (US)

(73) Assignee: MediaTek Inc., Science-Based Industrial Park, Hsin-Chu (TW)

( * ) Notice: Subject to any disclaimer, the term of this patent is extended or adjusted under 35 U.S.C. 154(b) by 617 days.

(21) Appl. No.: 12/136,180

(22) Filed: Jun. 10, 2008

(65) Prior Publication Data

US 2008/0307244 A1    Dec. 11, 2008

Related U.S. Application Data

(60) Provisional application No. 60/934,058, filed on Jun. 11, 2007.

(51) Int. Cl.
*G06F 1/26* (2006.01)
*G06F 1/00* (2006.01)

(52) U.S. Cl. ........ 713/323; 713/320; 713/321; 713/322; 713/340

(58) Field of Classification Search .............. 713/322, 713/321, 340, 320, 323
See application file for complete search history.

(56) References Cited

U.S. PATENT DOCUMENTS

| | | | | |
|---|---|---|---|---|
| 6,154,845 | A * | 11/2000 | Ilkbahar et al. ............. | 713/300 |
| 6,282,662 | B1 * | 8/2001 | Zeller et al. ................. | 713/300 |
| 6,968,469 | B1 | 11/2005 | Fleischmann et al. | |
| 7,093,147 | B2 * | 8/2006 | Farkas et al. ............... | 713/320 |
| 7,664,970 | B2 * | 2/2010 | Jahagirdar et al. ......... | 713/300 |
| 2003/0110012 | A1 | 6/2003 | Orenstein et al. | |

FOREIGN PATENT DOCUMENTS

EP    1555595 A    7/2005

OTHER PUBLICATIONS

Partial European Search Report for European Patent Application No. 08251686.5-2224, dated Oct. 28, 2008.

* cited by examiner

*Primary Examiner* — Thomas Lee
*Assistant Examiner* — Aurel Prifti
(74) *Attorney, Agent, or Firm* — Winston Hsu; Scott Margo

(57) ABSTRACT

An integrated circuit comprising a plurality of processing cores, characterised by comprising electrically controllable switches for controlling the supply of power to one or more of the processing cores, a memory for saving state data from at least one of the processing cores and a controller adapted to control the supply of power to one or more of the processing cores such that processing cores can be de-powered.

13 Claims, 5 Drawing Sheets

METHOD OF AND APPARATUS FOR REDUCING POWER CONSUMPTION WITHIN AN INTEGRATED CIRCUIT

RELATED APPLICATION

This application claims priority to U.S. provisional application 60/934,058, filed on Jun. 11, 2007, the contents of which are incorporated herein by reference.

FIELD OF THE INVENTION

The present invention relates to a method of and apparatus for reducing power consumption within an integrated circuit, and particularly within a digital processor having multiple processing cores or multiple subsystems.

BACKGROUND OF THE INVENTION

Integrated circuits may be provided which have several distinct functional blocks provided within them. Thus a single integrated circuit might include a general purpose processor, a maths co-processor, a digital signal processor and other dedicated hardware optimized to perform a particular task or calculation. However, not all of these cores or hardware resources within the integrated circuit may be required to be operational at the same time.

SUMMARY OF THE INVENTION

According to a first aspect of the present invention there is provided a method of reducing power consumption in an integrated circuit comprising at least one processor core, the method comprising:
  providing a device to control the supply of power to at least one of the processor cores;
  providing a memory for saving state data of the at least one processor core; and
  providing a controller to control transfer of state data between the at least one processor core and the memory such that the at least one processor core can be de-powered and restarted under the control of the controller and can be returned to its state as recorded just prior to de-powering.

Preferably the controller is formed of a hardware portion and a software portion which co-operate to control the transfer of state data and to perform the power down and power up of the at least one processor core. This combination allows the data transfer to be handled flexibly by the software, whereas the control of parts of the power down and power up sequence that may require tight control can be performed by the hardware.

Advantageously the controller is responsive to a clock controller that controls the provision of clock signals to each processor core such that if a clock signal is sent to the core then power is supplied to the core by the controller. Thus provision of a clock signal can be used to inhibit the controller removing power from a processor core and can also be used to force the controller to re-supply power to a core.

Each processor core may be associated with a "slow clocking" bit which controls whether power gating is allowed once a processor core is idle, or whether power gating is only allowed once a processor core, or optionally the entire processing system, is in slow clocking.

A clock controller may monitor the clock requirements of each processor core and the controller such that a system clock can be switched off once none of the processor cores and the controller have a continuing requirement for a clock. The clock controller then re-establishes the clock once an interrupt is received, a timed event occurs or any other process that establishes a need for a clock occurs.

According to a second aspect of the present invention there is provided an integrated circuit comprising a plurality of processing cores, electronically controllable switches for controlling the supply of power to one or more of the processing cores, a memory for saving state data from at least one of the processing cores and a controller, wherein the controller is adapted to control the supply of power to one or more of the processing cores such that it can be de-powered.

In an extension of this principle the processing cores could be on the same or different chips or subsystems and the switches might also be discrete components. The controller still, advantageously, comprises a mixture of a hardware portion and a software portion such that the software portion can provide flexibility in control of the power down process.

Advantageously the controller also controls the transfer of state data between the at least one core and a memory such that the state of the core can be recorded prior to de-powering and the core can be returned to that state upon power up. In a system where the controller comprises both a hardware and a software portion, the transfer of the state data is advantageously controlled by software running on the core that is being de-powered or re-powered.

Preferably isolation components are provided to isolate the core output from other components within the integrated circuit in order to avoid perturbing the operation of those components at power up or during power down. The isolation components also prevent un-powered circuits in a de-powered processing core from perturbing the operation of the circuits that are powered. In a system where the controller comprises both a hardware and a software portion, the control of the isolation components is advantageously controlled by the hardware portion such that this functionality can be relied upon irrespective of the state of development of the associated software portion.

It is thus possible to provide an integrated circuit in which current consumption can be reduced, even when that current consumption occurs as a result of leakage.

BRIEF DESCRIPTION OF THE DRAWINGS

The present invention will further be described, by way of example only, with reference to the accompanying Figures, in which.

DESCRIPTION OF PREFERRED EMBODIMENT OF THE INVENTION

Figure 1:
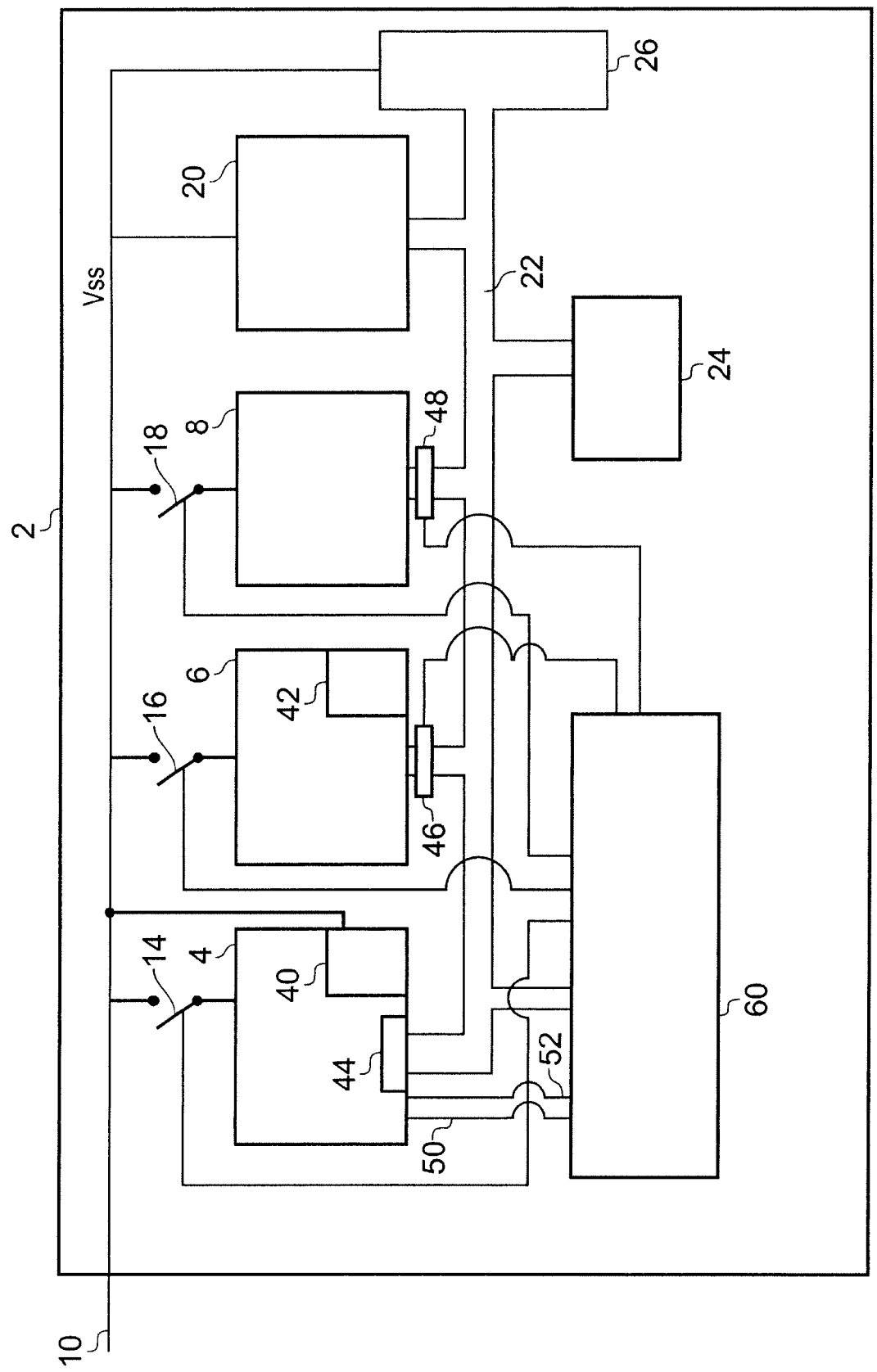
FIG. 1 schematically illustrates an integrated circuit having multiple process cores and constituting an embodiment of the present invention.

FIG. 1 schematically illustrates an integrated circuit, generally designated 2, constituting an embodiment of the present invention. The integrated circuit comprises a plurality of processing cores which for brevity may be simply referred to as "cores". In a preferred embodiment the integrated circuit comprises a CPU and a digital signal processor. However, in order to clarify that the invention is not merely limited to two core systems, a more complex embodiment will be described. Of these, first, second and third cores 4, 6 and 8, respectively, can be selectively connected to a power supply rail 10 via respective electrically controllable switches 14, 16, and 18. These switches act as "power-gates". The cores may be generally equivalent, or may have dissimilar functionality. Thus one of the cores might for example be a digital signal processor, whereas another might be a maths co-processor. A further processing core could be highly specific, for example a path searcher for use in a UMTS mobile telephony system. Optionally one core, 20, might be permanently powered up. However the number of cores is a system designer's choice and there may for example only be one or two cores within the chip and one or both of them may be connected to the supply rail via a switch. Each of the processor cores can communicate with other system components along a databus 22. Other components include memory 24 and an input output interface 26.

Normally it would be expected that power consumption within a core or other digital circuit could be prevented by reducing the clock frequency to zero. However, the move towards smaller and smaller circuit geometries has resulted in leakage currents becoming a significant proportion of the total current usage. Thus, it becomes desirable to include active control of leakage current, especially where lower threshold transistors are being employed to gain higher clock speed as these low threshold transistors exhibit significantly more leakage current than high threshold transistors. It can be seen that, for example, if the first core 4 is not actively processing data, then its leakage current could be reduced to zero by disconnecting it from the supply rail 10. However merely de-powering one of the processor cores within the integrated circuit shown in FIG. 1 without taking any further steps could compromise the operation of the entire circuit.

In order to overcome these problems additional components are provided. In order to temporarily shutdown a processor core, and substantially return to the same state, it is necessary to be able to store selected data from the core in order to aid its return to an operational state. Thus, for example, where a processing core has several registers and a stack, then it is clearly advantageous to be able to store the register values, the contents of the stack, and the value of the stack pointer in memory such that, upon power up, these values can be returned to the core. It also follows that for any other core, or indeed dedicated hardware circuit where register values control the operation of the circuit or are key to the output of the circuit, then it is also desirable to be able to store those values as part of the active leakage management system. This data from the core can be regarded as state data as it is representative of the state of the core.

In order to lessen the time required to save the state data, and to retrieve it upon power up, it is advantageous that the state data be held in a memory which is tightly coupled and easily accessible to the core. Dedicated memory may be provided within the core, for example memory areas 40 and 42 may be non-volatile memory within the core, or alternatively a small portion of the memory segment reserved for state data may have its own independent power supply such that it remains powered at all times, as is shown for the memory area 40 of the first core 4. However, it is also possible that the state data can be written to more remote memory, such as memory 24 accessible across the databus 22.

The power off and power on events of the or each core 4, 6, or 8, are likely to result in the core being in an undefined state during the power down and power up sequence until its supply rail has been fully established and some form of reset procedure has been initiated. It can therefore be seen that, for example, the output of the core may also be in an undefined state or indeed several states during the power up sequence. This could give rise to the possibility of signals being erroneously delivered to other parts of the circuit and these erroneous signals being interpreted as if they were valid. In order to avoid this, an isolation circuit is provided such that the core is inhibited from placing data on the databus 22 or from sending other output signals until its correct operation is established. The isolation may be provided by a dedicated circuit 44, 46 and 48 associated with one of the cores 4, 6, and 8 respectively. The isolation circuit 44 for core 4 is shown as being internal to that core and might, for example, be provided by a tri-state output of that core which has been engineered not to go to a low impedance state until the core has definitely achieved a predetermined point in its power up sequence. In a preferred embodiment of the invention, the isolation circuit drives the core's outputs into their RESET state. This ensures a valid set of signals to circuits that are responsive to the output of the core. Alternatively external isolation circuits, for example 46 and 48 may be provided and may remain permanently powered, thereby ensuring that the core 6 or 8 remains isolated from the databus until such time as an active leakage management controller 60 determines that the core should be reconnected to the databus.

The active leakage management controller 60 may itself be connected to the databus such that instructions controlling its operation can be written to it. It may also use the databus to receive messages from any one or more of the cores indicating that they have reached a position where sufficient state data has been saved such that a power down is possible. Additionally or alternatively the active leakage management controller 60 may also have a direct connection to one or more of the cores, for example core 4 such that it can monitor the status of the core, by monitoring the status of a flag which may be set by software executing on the core just prior to enabling a power down, or by monitoring the instructions (OP CODES) being executed by the core so as to identify a specific state in the power down sequence. In preferred embodiments each of the cores has an "IDLE" output (of which only output 50 of core 4 is shown in FIG. 1) which indicates when the core has entered on IDLE state. Once a core has entered an IDLE state it stays there until prompted to exit the idle state by an external event. The external event may be the assertion of a "WAKE UP" signal issued on a WAKE UP line 52 (again only shown for core 4 of FIG. 1 for clarity) which may be issued by the active leakage management controller 60, and/or by a clock controller (not shown) which is a well known feature within integrated circuits where power consumption is an important design consideration.

Advantageously the active leakage manager also comprises a software portion that runs in each of the cores 4, 6, and 8 that might be placed into a powered down state. For convenience, and in a preferred embodiment, the active leakage management software is stored in the memory close to the processor core and is likely to be, for example, a level one instruction memory or an instruction tightly coupled memory if, for example, the processor is an ARM processor.

As noted before, during shutdown the state data representing the internal state of selected registers within one (or more) of the processor cores, such as core 4, is written to a memory. This memory can be designated active leakage management memory and may for example be a reserved area within the memory 40, or alternatively the memory 40 might be regarded as being volatile, only in the sense that the original data in the memory will be overwritten during the processor state save and store routine. However the memory itself must act in a non-volatile way as its contents need to be preserved during the power down state.

Figure 2:
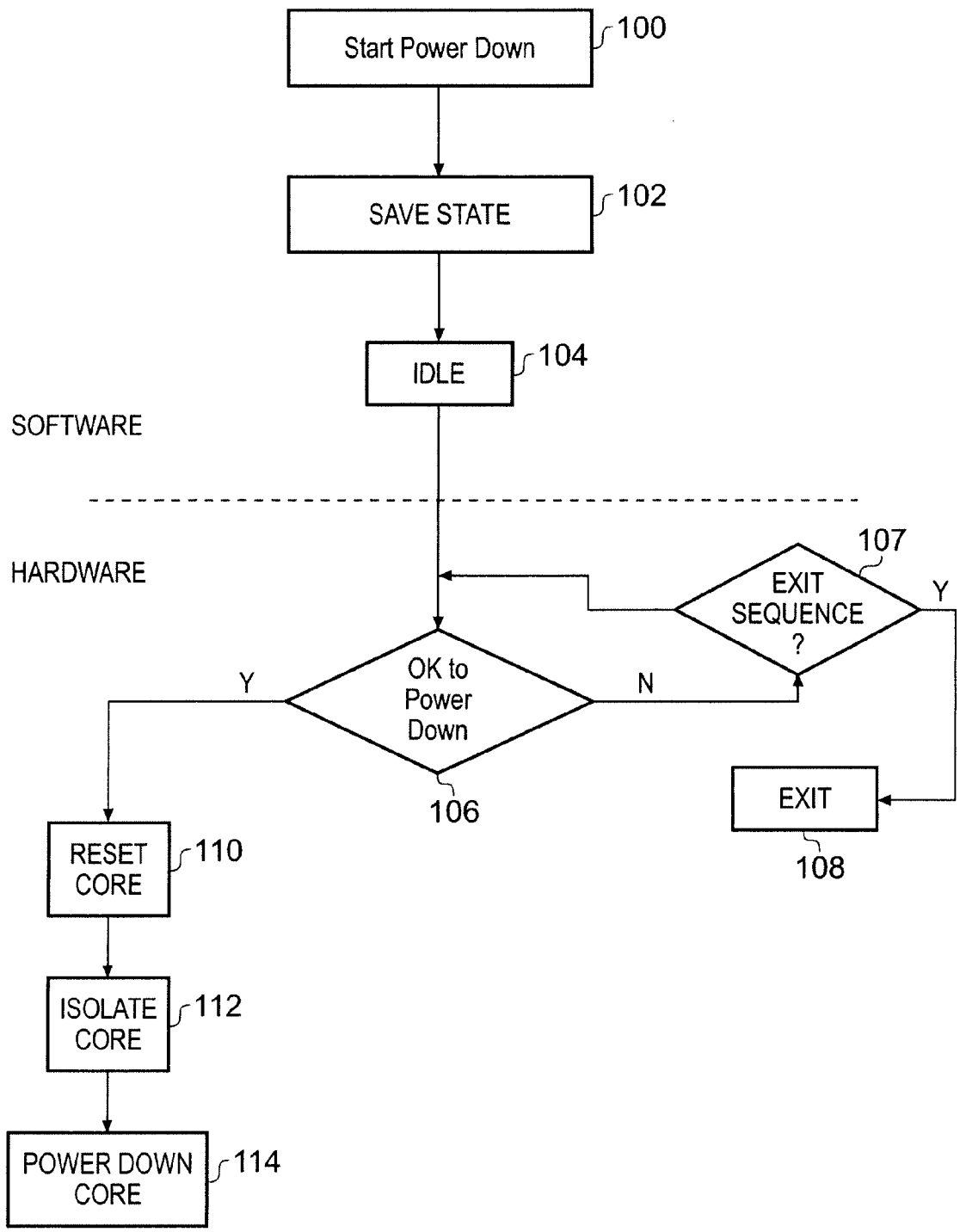
FIG. 2 schematically illustrates a power down sequence for the integrated circuit shown in FIG. 1.

FIG. 2 schematically illustrates a power down sequence which may be executed jointly by the active leakage manager software running within one of the processor cores, and the controller 60. The process starts at step 100 where it has already been determined that the power down sequence should be started. Monitoring software executing in the core, or on another core, can be used to determine when any one of the processor cores, for example the first core 4, has completed a task and will not be required to process another task for a period of time which makes it beneficial in order to shut the core 4 down. For example, within the context of a mobile telecommunications devices such as a telephone, most of the device can be de-powered for most of the time. The device periodically wakes up, for example every second or so, in order to check if it is being called by checking a paging channel, and/or to check if the estimate of the multi-path distortion existing between the base station and the mobile device needs updating. The time taken to execute these tasks is quite predictable, as is the inter-task interval. Therefore if no other task is pending then the core 4 can estimate how long it will be idle for. It can then make a decision as to whether it is worthwhile entering a power down sequence. Allowing software to decide whether to allow a core to power down allows considerable flexibility in the control of the power to the core. The software can be easily reconfigured to determine one or more criteria before making a power down decision. These "power down" criteria may include workload of the core that is to be powered down, workload of other cores that may call on the core that is to be powered down, clock speed of one or more of the cores and scheduled tasks, or even recent events that have the capability to call high priority tasks. Assuming that software executing within the core 4 determines that a power down sequence is desirable, then the sequences commence. From step 100 control passes to step 102 where the software portion of the controller saves state data to memory. The software portion can be tailored by the system designer to only save sufficient state data as is deemed necessary for a successful restart. This flexibility can be exploited to reduce the amount of data that is saved in return for a faster shut down, or alternatively data may be parameterized for shut down. Reducing the amount of data saved to a minimum also reduces the amount of time required to restart the processor from the de-powered state. This is particularly important as this determines the system's latency to handle an interrupt. Furthermore, as hardware configurations of the core may change over a different generations of a product and features may be added or removed, the use of a software component allows these changes to be accommodated more quickly and at much lower cost than would be the case if the entire active leakage management system were implemented in dedicated hardware alone.

It follows that different cores, which are tailored to different tasks, run different versions of the software portion that saves the state data.

Once the software portion has completed saving the state data to memory, it issues an IDLE instruction which places the core in IDLE at step 104. The core stays in IDLE until a wake up signal or an interrupt is issued to the core, and going into IDLE causes a "core IDLE" signal to be asserted at an output of the core and which is monitored by the hardware of the controller 60.

From step 104 control is passed to step 106 where the hardware of the controller 60 makes a decision as to whether to continue with powering down of the core. This decision may be split into several parts. A first part may comprise examining one or more control registers, such as a power down sequence control register and a debug control register.

Figure 3:
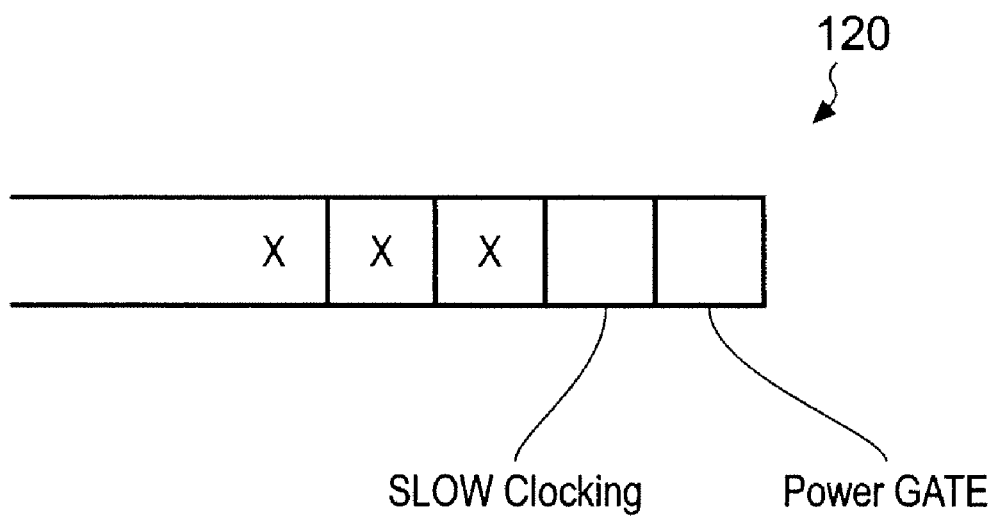
FIG. 3 illustrates part of a control register that is used to influence the power down sequence.

FIG. 3 schematically illustrates part of a control register 120 for one of the processor cores. A similar control register will exist for the or each other processing core. It can be seen that two bits of the register can be reserved as part of the power control system. The right hand most (least significant) bit is reserved as a power-gate enable control bit. Thus, if this is set to a "one" then power gating is enabled and consequently the controller 60 is empowered to operate the respective switch, for example 14, so as to disable power to the core if, and only if, other conditions are satisfied. However if power gating is disabled the switch 14 will always be in a conducting state. The other bit is used to control whether the system must be in slow clocking mode, i.e. the system oscillator frequency has been reduced or has been switched off, before power gating of the processor core is allowed. Thus the bits can be determined in unison such that power gating can be enabled or disabled, but that a hierarchy of commands exists such that if a clock controller requires a clock signal to be on and to be provided to the core, then power gating cannot be performed. The clock signals to each core can be independently gated such that one core can have its clock inhibited whilst one or more other cores receive a clock. A clock controller (not shown) can control the supply of clock trains to each of the cores individually in response to a bit set in a clock requirement register that defines whether a core needs a clock or not. Once none of the cores require a clock, and the controller 60 has executed the power down sequences, so it no longer requires a clock, then the clock controller can reduce the system clock frequency, optionally to zero, to conserve power until processing needs to be resumed.

In a preferred embodiment the power-gate bit self clears so as to ensure that power-gating is not performed by accident. Therefore, when it is desired to perform power-gating, the power-gate enable bit must be set prior to entering the idle instruction that will be a precursor to powering the core down. However the power-gate bit also automatically clears itself when an idle instruction has been executed in the processor core.

Clearly in any complex system, and especially one involving software, it is highly desirable to modify the operation of the system during software development such that the status of the software can be monitored. Thus a debug register may be provided that includes a control bit that can inhibit power gating from occurring irrespective of the instructions issued by the controller 60.

After examining the control register step 106 also checks to see if any other events are pending which should cause power down to be inhibited. Examples of this are interrupts which have been issued to the core. The interrupts to the cores are monitored by the controller 60.

If the controller 60 determines that powering down of the core should not be performed then control passes to step 107 where a test is made to see if the power down sequence should be exited, for example because a request for the core to perform some processing has been issued. The controller may wait at steps 106 and 107 (which could be combined in a single step—especially when the controller 60 is implemented as a state machine) before proceeding to either step 110 or step 108. If the sequence is to be exited then control passes to step 108. Although the power down sequence has been described in terms of a flow chart the hardware portion is, in a preferred embodiment, implemented as a state machine.

If the controller 60 determines that the core 4 can be de-powered, then it controls the hardware associated with the core such that a reset signal is asserted to reset the core 4, as set out at step 110, then the respective isolation circuit 44 is operated at step 112 so as to isolate the core 4 from the or each other core 6, 8, 20 within the circuit, and then the respective switch, for example 14, is opened (goes non-conducting) so as to de-power the core 4. The switches are implemented as transistors.

Figure 4:
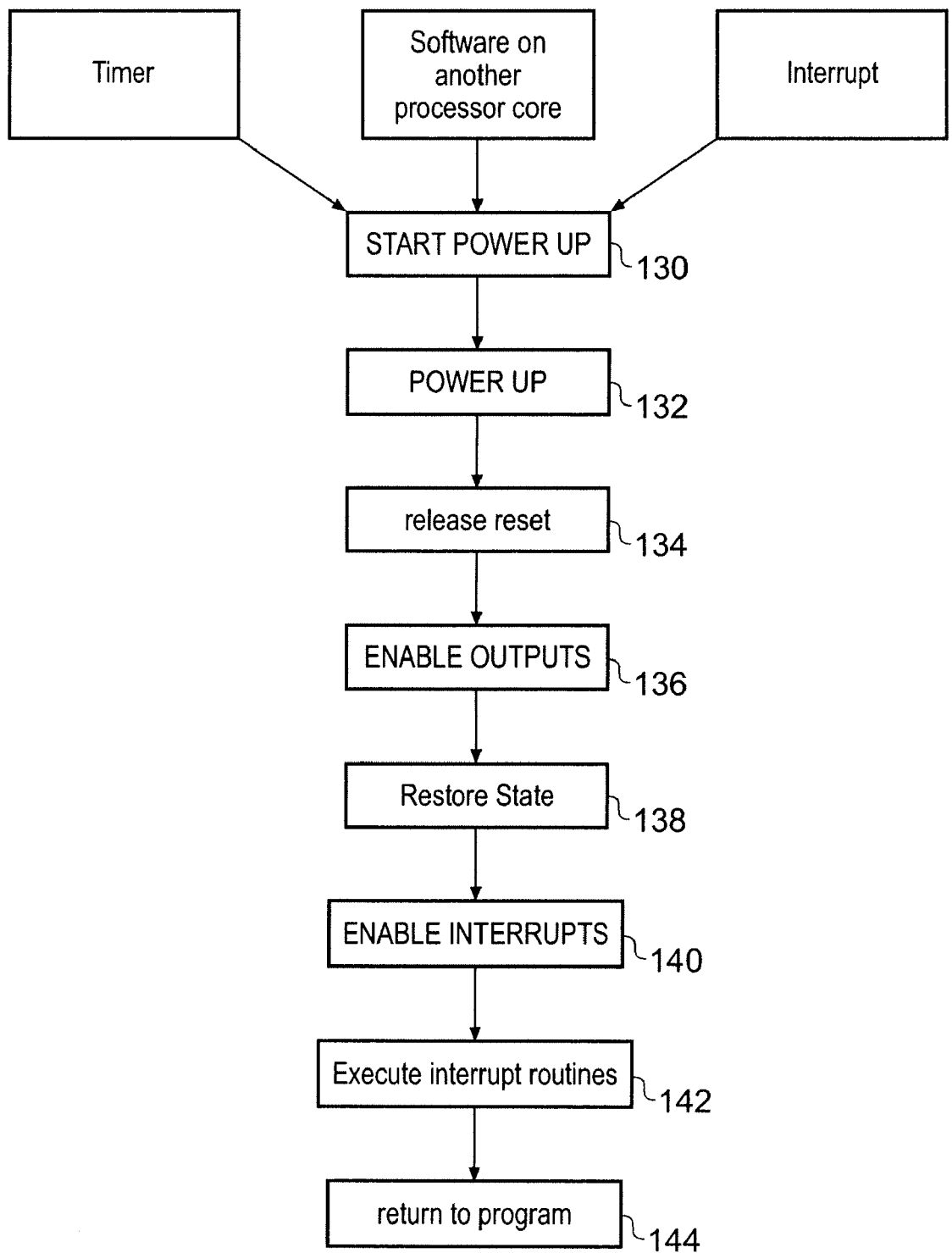
FIG. 4 schematically illustrates power up sequence for the integrated circuit shown in FIG. 1.

FIG. 4 schematically shows a power up sequence. Power up may be initiated by a call to the controller 60 by software running on another processor desiring to make use of the facilities provided by the de-powered core. Alternatively, where the data processor core has placed itself into a powered down state pending a scheduled event, the data processor core can set a timer to count down to that event, and to initiate re-powering of the core in sufficient time that it can be restored to an operative state sufficiently in advance of the expected event for it to be able to handle the event. Additionally, a circuit may cause an interrupt to be issued thereby awakening the de-powered processor core in order to service a specific task. Each of these events causes the power up sequence to be initiated at step 130. Any of these events can also be routed to a slow clocking controller (not shown) in order to cause the clock speed supplied to the relevant data processor core to be returned to its fast clocking rate as soon as possible. If the clock had been inhibited (where, for example slow equals zero) then the controller 60 monitors the clocking circuit for an indication that the clock has been returned to its operational speed and that its frequency has stabilized to within acceptable limits. In the meantime the controller 60 closes the switch (step 132), for example switch 14 such that power is returned to the core. Additionally power up may also be initiated by events such as an emulation request from an emulator or debugger, a reset signal being sent, or indeed the clock controller re-establishing the system clock to the core.

Re-powering the core allows inrush currents to occur which might perturb other circuits within the integrated circuit. In order to avoid this each power-gate switch 14, 16, 18 may be implemented as a plurality of switches provided in parallel and they may be switched on in sequence such that the number of switches that are conducting in conjunction with the intrinsic resistance of the or each switch limits the inrush current. Additionally the time that the ramping of the switch is applied for to limit inrush current can be controlled. In a preferred embodiment the ramping of the switch and the number of switches in use are controlled by software. Once power has been restored and, if necessary, the clock has been restored to its correct frequency, control passes to step 134 such that the controller 60 can enable the isolation circuits 44 to allow the core to communicate with the databus 22 and other components and release the reset line of the processor core thereby allowing the processor to start operation (step 136). The processor is constructed so as to always look to a predetermined address upon the end of reset for its first instruction. Therefore a reboot routine can be executed to test whether the processor is returning from a power off condition prompted by the active leakage management system. It can do this, for example, by examining the content of the active leakage memory or by examining a power-gate status register that will be described later. If the processor determines that it is in a power up state following power off as a result of the active leakage management system, it then executes a software agent (step 138) in order to restore the state data from the state memory 40. The interrupt for the core may then be re-enabled at step 140 and the core can execute any pending interrupt service routines at step 142. Finally, upon completion of any pending interrupts the core can then revert to its lowest priority software task at step 144.

As is noted herein, it is advantageous to detect whether the core is returning to a power up state as a result of an active leakage management initiated power down.

Figure 5:
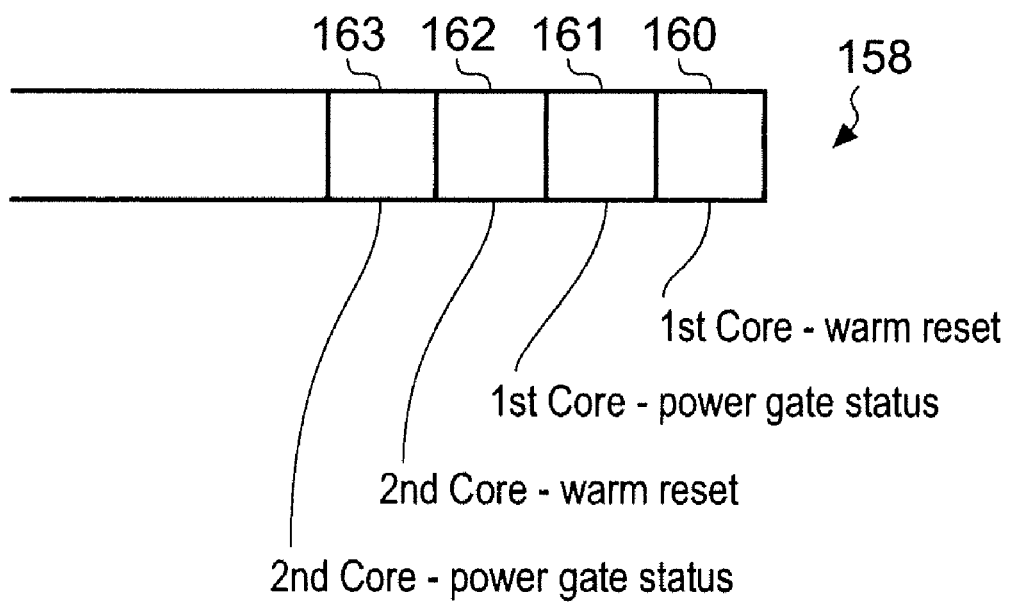
FIG. 5 illustrates part of a register used to control power gating.

In order that the status of the or each core 4, 6, 8 can be detected, namely whether it is powered up or powered down, and whether a core is powering up from a cold reset, that is system power is being applied for the first time, or a warm reset where the core has been de-powered as a result of the active leakage management system, it is desirable to hold information to enable this to be determined in a register which is accessible to the core. FIG. 5 shows the first four bits in a power-gate status register 158 which can be extended so that any number of cores within an integrated circuit can examine the power status of other cores, and can also determine whether they are starting up from a cold or warm reset. Thus, a first bit 160 is a warm reset bit which can be set by the active leakage management system hardware (or software) to indicate to the first core that when it returns to power up that it is being powered up by the active leakage management system. If the bit 160 is not set, then the core can determine that it is being powered up from a cold reset and then executes in normal wake up procedure. However if the bit 160 is set, then it can determine that it is being powered from a previously saved state and consequently it should call the active leakage management system power up software so as to recall its state data from the state memory 40, 24. Some cores, such as Analog Devices' "BLACKFIN" core or the MediaTek "Fcore" allow an external reset vector to control whether a power gate reset handler or a normal reset handler should be executed. A second bit, 161, indicates the power-gate status of the first core. Thus, for example, if this bit is a set then the power-gate is turned off and consequently the core is unpowered. However if this bit is zeroed then the power-gate is turned on and the core is powered. Analysis of register provides an easy way for each core to determine the status of other cores within the integrated circuit. This is advantageous as, for example, a core may wish to call on a service provided by the other or another of the cores in the integrated circuit.

When implementing this invention some features of the core may need modification. For example some handshaking may be required between the core 4, the active leakage management controller hardware 60 and the clock control circuitry. Additionally steps may need to be taken to control access to that memory within the core which remains powered whilst the core is in a de-powered state. In some instances the designer may wish the memory to be inaccessible to other devices. In other instances of the invention the system designer may arrange the system such that the memory is accessible, or that an attempt to access the memory will initiate re-powering of the core, for example by causing the system clock to be re-applied to the core which in turn forces the power active leakage management controller to re-power the core.

Waking the core up from its power down state inevitably involves an overhead which could increase system response latency. It is therefore necessary to ensure that any wake up events which are timed to happen allow a sufficient additional time period for the power up sequence to be completed, and for the core to retrieve its data and to return to an operational state. Thus, when a timing event processor, i.e. a timer which is used to initiate power up, generates a wake-up call, it may cause the core 4 to be returned to the powered up state, with its state data restored, but without actually initiating processing of the timed event until the proper time for processing the scheduled event arrives.

Given that the cores can be de-powered in response to a combination of software and hardware control, it is desirable to add debug registers such that, for example, power gating to switch the core off may be prevented by the debugger and the debug register may also include bits which can be used to force the power gating to switch the power to the core off or to switch the power to the core on, or to allow the power-gate controller to operate as normal, but to over-ride its outputs for debugging purposes.

It would be possible to provide additional low leakage hardware registers which could be used to mirror the register states within a core so as to save the register contents, rather than writing the register contents to memory. Whilst this hardware only approach would be very fast, it would also be inflexible and would also increase the amount of area on the silicon die required by the invention as the space required by the registers would be bigger. The combination of a hardware controller working in combination with a software entity executing on the core that is subject to power gating gives a combination which is relatively fast and robust, but which still retains flexibility if it is desired that fewer, or more, elements need to be saved as part of the state data.

Although the description herein has described the various process steps by way of flow charts for simplicity, it will be appreciated that the system can be controlled by a state machine, and that controller 60 is particularly suitable for implanting as a state machine.

Specific processor cores may require particular handling. For example the Arm 7 processor performs an idle operation by writing to a specific register external to the core which in turn disables the clock to the core. The result is that the Arm 7 stops in that write instruction, and once the clock is restarted the Arm 7 core continues by executing the next instruction after this write. As the clock is gated externally to the core, the interrupts should not be enabled when placing the Arm 7 in idle mode. However, the Arm 9 core has special instructions which puts it in a standby and "wait for interrupt" state. Therefore the hardware of the controller 60 should be designed by the system designer to take into account the ways in which the associated cores operate. By way of contrast, other cores such as the "BLACKFIN" core by Analog Devices can be restarted by a "WAKE UP" signal to the core even if the interrupts to the core have been disabled. Taking account of the various core specific requirements is a reasonably easy task for the system designer when implementing control of power consumption in accordance with the present invention.

Some logic associated with a core may always remain powered so as to support the use of emulators or debuggers during a power down sequence. This can facilitate an emulator staying connected to and in communication with a target core during a power down event initiated by the active leakage management controller.

It is also possible to restore power to a core but to discard its previously saved state data if, for example, another processor requires the core to perform a task for it. This can be done by allowing the other processor to modify the power gate register so as to fool a core into thinking it is being powered up from a cold reset. Alternatively where the core is responsive to a reset vector to control its power up sequence, this could be modified.

Figure 6A:
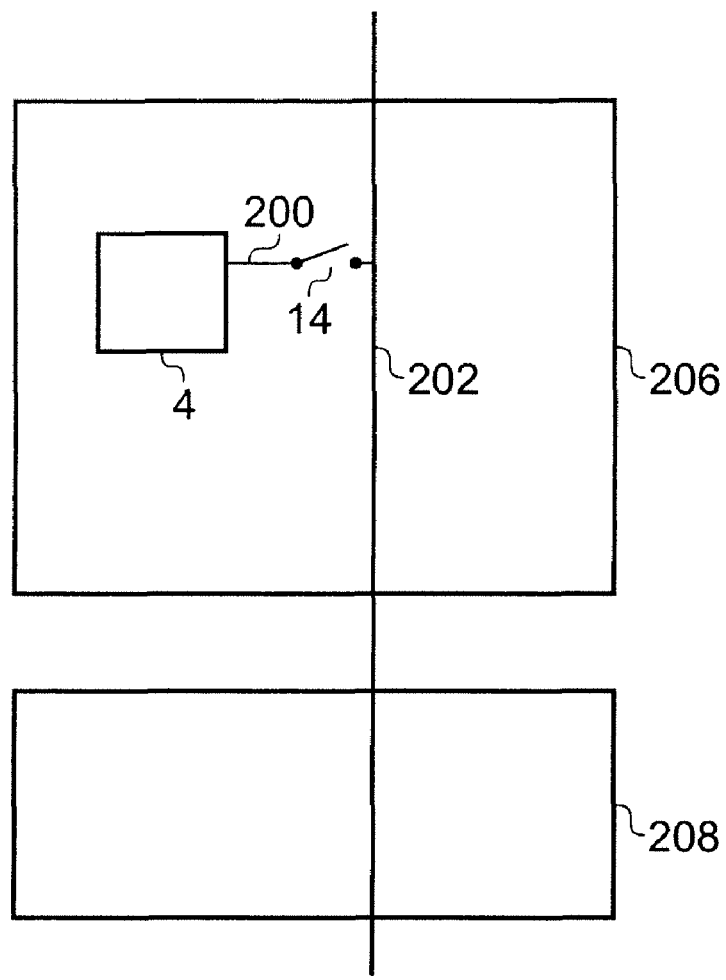
FIGS. 6a and 6b show layouts for macro-elements for use in power gated integrated circuits.
Figure 6B:
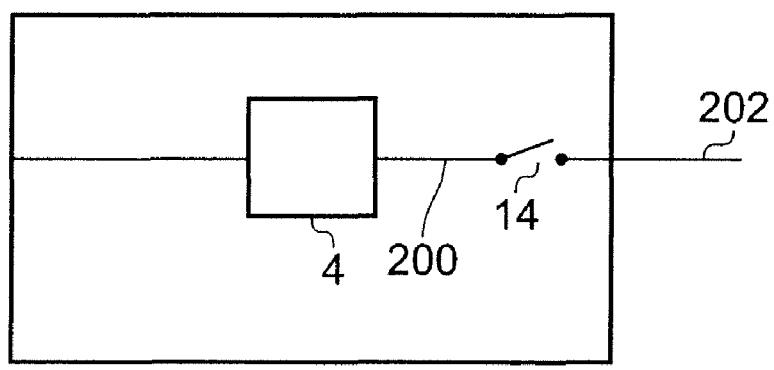

At a practical implementation level, the cores which are subject to power gating are often defined in integrated circuit design tools as macro elements. Each macro element can be positioned on the silicon die at the designer's will (subject to certain constraints perhaps being met). Power connections to the macro element are then made via a metalized layer which is deposited above the silicon implementing the macro element. The power-gate control transistors 14, 16, 18 and so on need to be connected to their respective core via a metalized conductor, and also need to be connected to power supplies outside of the boundary of the macro element. Such an arrangement is shown in FIG. 6a where the connection between the switch 14 and the core 4 (reusing the labeling used in FIG. 1) is made via a first metal layer 200 and whereby the power supply connection running between a macro element 206 and a subsequent macro element 208 is made via a further conductor 202. In order to simplify routing of the conductors, the conductors 200 and 202 will be formed in different planes. However, the inventors have realized that this complexity can be avoided if the power-gate control switches 14, 16, 18 and so on are placed at the periphery of the macro elements, for example as shown in FIG. 6b. In this arrangement the conductor 202 extending between macro elements and the conductor 200 connecting the switch to core can be formed in the same physical plane thereby reducing the number of metal layers required by one. Placing power gate control switches at the edges of macro elements enables existing macro elements to be used without further modification.

The invention claimed is:

1. A method of reducing power consumption in an integrated circuit comprising at least one processor core, the method comprising: providing a device to control the supply of power to at least one of the processor cores, respectively; providing a memory for saving state data of the at least one processor core; and providing a controller to control transfer of state data between the at least one processor core and the memory such that the at least one processor core can be de-powered and restarted under control of the controller and can be returned to its state as recorded prior to de-powering, wherein the controller comprises a hardware portion and a software portion, and the software portion is arranged to control transfer of state data between the memory and the at least one processor core, and the hardware portion is arranged to control the supply of power to the at least one processor core, wherein both the software portion and the hardware portion are masters for controlling the supply of power of power, and during the process of powering down a processor core the software portion places the processor core that is to be de-powered into a predetermined state once the software portion has caused sufficient state data to be saved, and the hardware portion is responsive to the predetermined state to remove cause removal the supply of power from the processor core.

2. A method of reducing power consumption as claimed in claim 1, in which upon return of power to a processor core, the processor core performs a check or hardware is examined to see if it had been de-powered by the controller and if it had the processor core retrieves state data from the memory.

3. An integrated circuit comprising a plurality of processing cores, comprising electrically controllable switches for controlling the supply of power to one or more of the processing cores, respectively, a memory for saving state data from at least one of the processing cores and a controller adapted to control the supply of power to one or more of the processing cores such that processing cores can be de-powered, wherein the controller comprises a hardware portion and a software portion, and the software portion is arranged to control the transfer of state data between the memory and the at least one processing core, and the hardware portion is arranged to control the supply of power to the at least one processor core, wherein both the software portion and the hardware portion are masters for controlling the supply of power, and during the process of powering down a core the software portion places the processing core to be powered down in a predetermined state or causes the processing core to issue a signal to the controller once sufficient state data has been saved to the memory and the controller is responsive to the processing core being in the predetermined state or the signal as an indication that power can be removed from the processing core to remove the supply of power from the processor core.

4. An integrated circuit as claimed in claim 3, in which the controller controls the transfer of state data between the at least one processing core and the memory such that a state of at least one processing core can be recorded prior to de-powering the processing core and the processing core can be returned to that state upon power up.

5. An integrated circuit as claimed in claim 3, in which the controller is arranged to monitor a clock signal supplied to each of the processing cores, and where the presence of a clock signal can be used to cause the power down process to be inhibited; or if a processing core is in a power down state to cause the power to be re- supplied to the processing core.

6. An integrated circuit as claimed in claim 3, further comprising isolation devices associated with respective ones of the processing cores such that a processing core can be isolated from other components.

7. An integrated circuit as claimed in claim 3, further comprising at least one control register for indicating when the controller is empowered to operate one or more of the electrically controllable switches to inhibit power supply to one or more of the processing cores.

8. An integrated circuit as claimed in claim 3, in which the controller is responsive to at least one of: a) an event timer; b) a power-up request issued by another processing core; and c) an interrupt; to cause the controller to power-up a processing core.

9. An integrated circuit as claimed in claim 3, further comprising a power gate status register which a processing core can examine to determine a power status of other processing cores and whether the processing core is being powered up under the control of the controller.

10. An integrated circuit as claimed in claim 3, in which one or more of the processing cores is associated with software which examines the tasks scheduled to be executed by the processing core and makes a decision as to whether to initiate a power down sequence for the processing core.

11. An integrated circuit as claimed in claim 3, further including debug registers to allow a user to force the processing cores to remain powered irrespective of power down instructions issued by the controller.

12. An integrated circuit as claimed in claim 3, in which the software portion examines at least one power down criteria when determining whether to continue with a process of powering down a core.

13. An integrated circuit as claimed in claim 3, in which each of electrically controllable switches further comprises a plurality of switching units, and when the electrically controllable switch is switched, the switching units are switched in sequence by the controller.

* * * * *

UNITED STATES PATENT AND TRADEMARK OFFICE
CERTIFICATE OF CORRECTION

PATENT NO. : 8,024,591 B2
APPLICATION NO. : 12/136180
DATED : September 20, 2011
INVENTOR(S) : Lars Seondergaard Bertelsen et al.

Page 1 of 1

It is certified that error appears in the above-identified patent and that said Letters Patent is hereby corrected as shown below:

Claim 1, column 10, line 45, replace the words "supply of power of power," with --supply of power,--.
Claim 1, column 10, line 49, replace the words "caused sufficient state" with --caused state--.
Claim 1, column 10, line 51, replace the words "remove cause removal the" with --remove the--.

Signed and Sealed this
Twelfth Day of June, 2012

David J. Kappos
*Director of the United States Patent and Trademark Office*